US008673798B2

(12) United States Patent
Nakamura

(10) Patent No.: US 8,673,798 B2
(45) Date of Patent: Mar. 18, 2014

(54) DIELECTRIC CERAMIC AND LAMINATED CERAMIC CAPACITOR

(75) Inventor: Tomoyuki Nakamura, Nagaokakyo (JP)

(73) Assignee: Murata Manufacturing Co., Ltd., Nagaokakyo-shi, Kyoto-Fu (JP)

( * ) Notice: Subject to any disclaimer, the term of this patent is extended or adjusted under 35 U.S.C. 154(b) by 177 days.

(21) Appl. No.: 13/195,147

(22) Filed: Aug. 1, 2011

(65) Prior Publication Data

US 2012/0033344 A1 Feb. 9, 2012

(30) Foreign Application Priority Data

Aug. 4, 2010 (JP) ................................. 2010-175376

(51) Int. Cl.
C04B 35/00 (2006.01)

(52) U.S. Cl.
USPC ............ 501/137; 501/136; 501/138; 501/139

(58) Field of Classification Search
USPC .................. 501/134, 135, 136, 137, 138, 139
See application file for complete search history.

(56) References Cited

U.S. PATENT DOCUMENTS

| | | | |
|---|---|---|---|
| 5,742,473 A | 4/1998 | Sano et al. | |
| 5,835,339 A | 11/1998 | Sakamoto et al. | |
| 5,835,340 A | 11/1998 | Wada et al. | |
| 6,344,427 B1 | 2/2002 | Komatsu et al. | |
| 7,273,825 B2 | 9/2007 | Muto et al. | |
| 7,397,649 B2 * | 7/2008 | Muto et al. ................. | 361/321.4 |
| 7,439,203 B2 | 10/2008 | Ito et al. | |
| 7,960,302 B2 * | 6/2011 | Zhang et al. .................. | 501/137 |
| 8,116,065 B2 | 2/2012 | Nakamura et al. | |
| 2011/0216472 A1 | 9/2011 | Nakamura et al. | |

FOREIGN PATENT DOCUMENTS

| | | |
|---|---|---|
| CN | 1921038 A | 2/2007 |
| CN | 101265087 A | 9/2008 |
| JP | 08-191031 A | 7/1996 |
| JP | 09-232180 A | 9/1997 |
| JP | 10-050549 A | 2/1998 |
| JP | 10-083931 A | 3/1998 |
| JP | 10-172857 A | 6/1998 |
| JP | 11-003834 A | 1/1999 |
| JP | 11-092222 A | 4/1999 |
| JP | 2000-058377 A | 2/2000 |
| JP | 2001-089234 A | 4/2001 |
| JP | 2004155649 A | 6/2004 |
| JP | 2006-282481 A | 10/2006 |
| JP | 3838036 B2 | 10/2006 |
| JP | 2007-063114 A | 3/2007 |
| JP | 2010-024086 A | 2/2010 |
| JP | 2011-187560 A | 9/2011 |
| WO | WO-2006-018928 A1 | 2/2006 |

OTHER PUBLICATIONS

Japanese Office Action issued for corresponding application JP 2010-175376, mail date Dec. 6, 2012 (with attached English translation).

* cited by examiner

Primary Examiner — Noah Wiese

(74) Attorney, Agent, or Firm — Dickstein Shapiro LLP

(57) ABSTRACT

A dielectric ceramic and a laminated ceramic capacitor using the dielectric ceramic are achieved which provide favorable thermal shock resistance without damaging properties or characteristics such as dielectric properties, insulation properties, temperature characteristics, and characteristics in high temperature loading, even when the dielectric layers are reduced in thickness and the number of stacked layers increased. The dielectric ceramic contains, as its main constituent, a barium titanate based compound represented by the general formula $ABO_3$, and a crystalline oxide containing Al, Mg, and Si is present as secondary phase grains in the dielectric ceramic.

14 Claims, 5 Drawing Sheets

DIELECTRIC CERAMIC AND LAMINATED CERAMIC CAPACITOR

BACKGROUND OF THE INVENTION

1. Field of the Invention

The present invention relates to a dielectric ceramic containing a barium titanate based compound as its main constituent, and a laminated ceramic capacitor using the dielectric ceramic.

2. Description of the Related Art

As ceramic materials for use in laminated ceramic capacitors, barium titanate based compounds which have a high dielectric constant have been widely known. In addition, inexpensive base metal materials such as Ni, which have favorable conductivity, have been widely used as internal electrode materials.

Furthermore, in connection with the development of electronics technology in recent years, a reduction in laminated ceramic capacitor size and than increase in capacitance has rapidly advanced.

This type of ceramic capacitor has a ceramic sintered body obtained by alternately staking dielectric layers composed of a dielectric ceramic and internal electrodes, and applying a firing treatment, and has external electrodes formed on both ends of the ceramic sintered body. Reducing the dielectric layer thickness and increasing the number of layers stacked allows for the reduction in size and the increase in capacitance for the laminated ceramic capacitors.

Furthermore, Japanese Patent Application Laid-Open No. 2006-282481 proposes a dielectric porcelain composition for laminated ceramic capacitors, which includes a main constituent containing a barium titanate and includes an oxide of Al, and has a plurality of dielectric grains in which the Al concentration decreased from the grain surfaces toward the inner parts of the grains.

In the case of Japanese Patent Application Laid-Open No. 2006-282481, the dielectric grains configured to have an Al concentration decreasing from the grain surfaces toward the inner parts of the grains improves the TC bias characteristics (temperature characteristics of capacitance in the case of applying a DC voltage) and the temperature dependence of insulation resistance IR while ensuring a high dielectric constant of 1000 or more and favorable temperature characteristics of capacitance.

SUMMARY OF THE INVENTION

In order to achieve the reduction in size and the increase in capacitance for laminated ceramic capacitors, the dielectric layers need to be reduced in thickness and increased in the number of layers stacked, as described above. Even though the dielectric layers are reduced in thickness and increased in the number of layers stacked, the laminated ceramic capacitors are required to have favorable thermal shock resistance in order to prevent cracks, etc., from being caused in the case of mounting by soldering.

In recent years, the lowermost and uppermost dielectric layers which do not contribute to the formation of capacitance, that is, the protective layers, have been also required to be reduced in thickness as much as possible and in turn, increase in the number of layers stacked, to obtain high-capacitance laminated ceramic capacitors, and the thermal shock resistance has thus become increasingly important. Therefore, there has been a need for the development of not only the device structures of the capacitors but also ceramic materials which have thermal shock resistance.

However, the device of Japanese Patent Application Laid-Open No. 2006-282481 fails to achieve sufficient thermal shock resistance, although allowing the mechanical strength to be improved by the addition of Al. For this reason, there is a possibility that laminated ceramic capacitors which have been reduced in thickness and increased in the number of layers stacked encounter cracks in the case of mounting, thereby resulting in a problem of inferior reliability.

The present invention has been made in view of these circumstances, and an object of the present invention is to provide a dielectric ceramic and a laminated ceramic capacitor using the dielectric ceramic, which provide favorable thermal shock resistance without damaging properties or characteristics, such as dielectric properties, insulation properties, temperature characteristics, and characteristics in high temperature loading, even when the dielectric layers are further reduced in thickness and increased in the number of layers stacked.

The present inventors have carried out earnest research with the use of barium titanate based compounds for ceramic materials in order to achieve the object, and have found that when a crystalline oxide containing Al, Mg, and Si is present as secondary phase grains, the thermal shock resistance can be improved while ensuring the properties or characteristics such as the dielectric properties, the insulation properties, the temperature characteristics of capacitance, and the characteristics in high temperature loading.

The present invention has been made on the basis of this finding, and a dielectric ceramic according to the present invention contains, as its main constituent, a barium titanate based compound represented by the general formula $ABO_3$, and in the dielectric ceramic, a crystalline oxide containing Al, Mg, and Si is characteristically present as secondary phase grains.

In addition, the barium titanate based compound in the dielectric ceramic according to the present invention preferably has an A site containing Ba in the range of 78 to 100 mol %, Sr in the range of 0 to 2 mol %, and Ca in the range of 0 to 20 mol %, and a B site containing Ti in the range of 96 to 100 mol %, Zr in the range of 0 to 2 mol %, and Hf in the range of 0 to 2 mol %.

As a result of further earnest research of the present inventors, it has additionally been found that a dielectric ceramic layer containing therein predetermined amounts of Ba or/and Ca, specific rare earth elements such as La and Ce, and specific elements such as Mn and Ni allows for further improvement in reliability.

More specifically, the dielectric ceramic according to the present invention preferably contains any of at least one element M1 of Ba and Ca, at least one element R selected from among La, Ce, Pr, Nd, Sm, Eu, Gd, Tb, Dy, Ho, Er, Tm, Yb, Lu, and Y, and at least one element M2 selected from among Mn, Ni, Co, Fe, Cr, Cu, Mg, Li, Al, Si, Mo, W, and V, wherein the content of the element M1 is 0.2 to 3 parts by mol with respect to 100 parts by mol of the main constituent, the content of the element R is 0.1 to 3 parts by mol with respect to 100 parts by mol of the main constituent, and the content of the element M2 is 0.2 to 5 parts by mol with respect to 100 parts by mol of the main constituent.

In a laminated ceramic capacitor according to the present invention, which includes dielectric layers and internal electrodes alternately stacked, the dielectric layers are characteristically formed from the dielectric ceramic according to any of the aspects of the present invention.

Also in the laminated ceramic capacitor according to the present invention, the internal electrodes preferably contain Ni as their main constituent.

The dielectric ceramic described above contains, as its main constituent, a barium titanate based compound represented by the general formula $ABO_3$, and a crystalline oxide containing Al, Mg, and Si is present as secondary phase grains in the dielectric ceramic. Thus, the thermal shock resistance can be improved while ensuring the properties or characteristics such as the dielectric properties, the insulation properties, the temperature characteristics, and the characteristics in high temperature loading. More specifically, a dielectric ceramic can be obtained which provides the favorable properties or characteristics, and resists defects such as cracks even when a rapid change in temperature is caused in the case of mounting.

In addition, when the dielectric ceramic contains any of at least one element M1 of Ba and Ca, the specific rare earth element R, and the specific element M2, in which the content of the element M1 is 0.2 to 3 parts by mol with respect to 100 parts by mol of the main constituent, the content of the element R is 0.1 to 3 parts by mol with respect to 100 parts by mol of the main constituent, and the content of the element M2 is 0.2 to 5 parts by mol with respect to 100 parts by mol of the main constituent, a dielectric ceramic can be obtained which provides further favorable characteristics in high temperature loading without leading to any decrease in dielectric constant.

Furthermore, in the laminated ceramic capacitor according to the present invention which has the alternately stacked dielectric layers and internal electrodes containing Ni or the like as their main constituent, the dielectric layers are formed from the dielectric ceramic according to any of the aspects of the present invention. Thus, the thermal shock resistance can be improved while ensuring the properties or characteristics such as the dielectric properties, the insulation properties, the temperature characteristics, and the characteristics in high temperature loading, and a laminated ceramic capacitor can be obtained which resists defects such as cracks even when a rapid change in temperature is caused in the case of mounting.

DETAILED DESCRIPTION OF THE INVENTION

Figure 1:
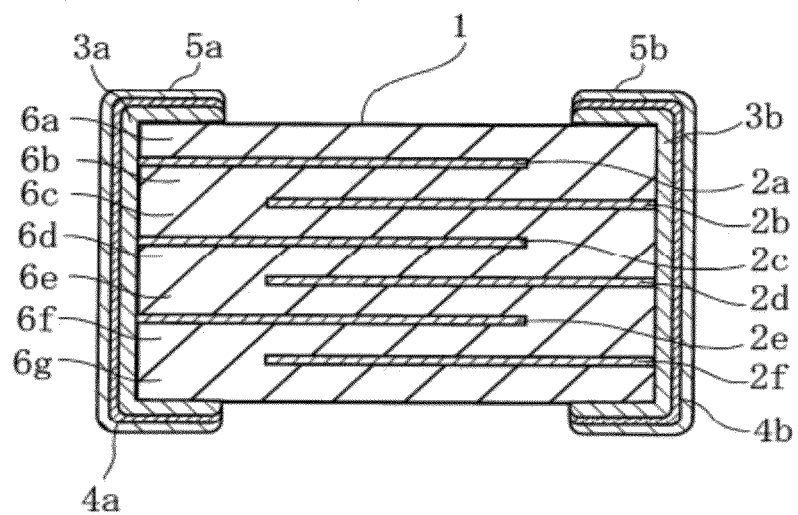
FIG. 1 is a cross-sectional view schematically illustrating an embodiment of a laminated ceramic capacitor according to the present invention.

Next, embodiments of the present invention will be described in detail.

A dielectric ceramic as an embodiment of the present invention contains a barium titanate based compound as its main constituent, and includes a crystalline oxide containing Al, Mg, and Si, which is present as secondary phase grains.

The barium titanate based compound has a perovskite-type structure represented by the general formula $ABO_3$, and specific forms can include $BaTiO_3$ with the A site containing Ba and the B site containing Ti; $(Ba,Ca)TiO_3$, $(Ba,Sr)TiO_3$, or $(Ba,Ca,Sr)TiO_3$, i.e., with some of the Ba substituted with at least one element of Ca and Sr; $Ba(Ti,Zr)O_3$, $Ba(Ti,Hf)O_3$, or $Ba(Ti,Zr,Hf)O_3$, i.e., with some of the Ti substituted with at least one element of Zr and Hf; or combinations thereof.

In the case of substituting some of the Ba with at least one of Sr and Ca, Sr is preferably 2 mol % or less, and Ca is preferably 20 mol % or less. More specifically, the A site preferably contains Ba in the range of 78 to 100 mol %, Sr in the range of 0 to 2 mol %, and Ca in the range of 0 to 20 mol %.

In the case of substituting some of the Ti with at least one of Zr and Hf, Zr is preferably 2 mol % or less, and Hf is preferably 2 mol % or less. More specifically, the B site preferably contains Ti in the range of 96 to 100 mol %, Zr in the range of 0 to 2 mol %, and Hf in the range of 0 to 2 mol %.

If the compounding molar ratio between the A site and the B site is supposed to be 1.000 stoichiometrically, the compounding is also preferably provided so that the A site or the B site is excessive, if necessary, to such an extent that has no effect on the various properties or characteristics, sinterability, etc.

Furthermore, a crystalline oxide containing Al, Mg, and Si (hereinafter, referred to as an "Al—Mg—Si oxide") is present as secondary phase grains in the dielectric ceramic.

This presence of the Al—Mg—Si oxide as secondary phase grains in addition to the barium titanate based compound as main phase grains allows the thermal shock resistance to be improved while ensuring the properties or characteristics such as the dielectric properties, the insulation properties, the temperature characteristics, and the characteristics in high temperature loading, thereby allowing for the achievement of a dielectric ceramic which causes no defects such as cracks even when a rapid change in temperature is encountered as in the case of mounting.

This is believed to be because the Al—Mg—Si oxide as crystalline oxide grains is present in contact with the conductive material in the internal electrodes, for example, Ni, and as a result, the resistance to the rapid change in temperature in the case of mounting is increased to improve the thermal shock resistance without damaging the properties or characteristics described above such as the dielectric properties.

In this case, the following three requirements need to be satisfied in order for the Al—Mg—Si oxide to be present as secondary phase grains. More specifically, when the three requirements are satisfied: (i) the respective elements of Al, Mg, and Si are present at substantially the same point; (ii) the total content of the respective elements of Al, Mg, and Si is 50 mol % or more in total after excluding oxygen atoms from the total (i); and (iii) the respective elements of Al, Mg, and Si are each 5 mol % or more independently after excluding the oxygen atoms from the calculation (i), it is recognized that the Al—Mg—Si oxide is present as secondary phase grains, thereby allowing the advantageous effects described above to be produced.

It is to be noted that whether the three requirements are satisfied or not can be confirmed easily by observation under a FE-SEM (field-emission-type scanning electron microscope) and a mapping analysis on composition in a WDX (wavelength-dispersive X-ray spectrometer).

In addition, the dielectric ceramic preferably also contains, as accessory constituents, at least one element M1 of Ba and Ca, a specific rare earth element R, and a specific element M2.

In this case, examples of the specific rare earth element R can include La, Ce, Pr, Nd, Sm, Eu, Gd, Tb, Dy, Ho, Er, Tm, Yb, Lu, and Y, and examples of the specific element M2 can include Mn, Ni, Co, Fe, Cr, Cu, Mg, Li, Al, Si, Mo, W, and V.

The addition of the element M1, the rare earth element R, and the element M2 as described above allows for further improvement in characteristics in high temperature loading, thereby allowing for the achievement of better reliability.

In the case of adding the element M1, the content of the element M1 is preferably 0.2 to 3 parts by mol with respect to 100 parts by mol of the barium titanate based compound as a main constituent. This is because the effect of improvement in reliability may possibly fail to be produced in the case of the element M1 being less than 0.2 parts by mol with respect to 100 parts by mol of the main constituent, compared with the case of no addition of the element M1, whereas an addition of the element M1 in more than 3 parts by mol may possibly decrease the dielectric properties.

In the case of adding the rare earth element R, the content of the rare earth element R is preferably 0.1 to 3 parts by mol with respect to 100 parts by mol of the main constituent. This is because the effect of improvement in reliability may possibly fail to be produced in the case of the rare earth element R being less than 0.1 parts by mol with respect to 100 parts by mol of the main constituent, compared with the case of no addition of the rare earth element R, whereas an addition of the rare earth element R is more than 3 parts by mol may possibly decrease the dielectric properties.

In the case of adding the element M2, the content of the element M2 is preferably 0.1 to 5 parts by mol with respect to 100 parts by mol of the main constituent. This is because the effect of improvement in reliability may possibly fail to be produced in the case of the element M2 being less than 0.1 parts by mol with respect to 100 parts by mol of the main constituent, compared with the case of no addition of the element M2, whereas an addition of the element M2 of more than 5 parts by mol may possibly decrease the dielectric properties.

It is to be noted that the forms of the element M1, rare earth element R, and element M2 added are not to be considered particularly limited, and the element M1, the rare earth element R, and the element M2 can be added in the forms of oxides, carbonates, etc. to the main constituent.

Next, a laminated ceramic capacitor using the dielectric ceramic described above will be described in detail.

FIG. 1 is a cross-sectional view schematically illustrating an embodiment of the laminated ceramic capacitor.

The laminated ceramic capacitor has internal electrodes $2a$ to $2f$ buried in a ceramic sintered body 1, has external electrodes $3a$ and $3b$ formed on both ends of the ceramic sintered body 1, and further has first plating films $4a$ and $4b$ and second plating films $5a$ and $5b$ formed on the surfaces of the external electrodes $3a$ and $3b$.

More specifically, the ceramic sintered body 1 is composed of dielectric layers $6a$ to $6g$ and internal electrode layers $2a$ to $2f$ stacked alternately and subjected to firing, and the internal electrode layers $2a$, $2c$, and $2e$ are electrically connected the external electrode $3a$, whereas the internal electrode layers $2b$, $2d$, and $2f$ are electrically connected the external electrode $3b$. Capacitance is formed between the opposed surfaces of the internal electrode layers $2a$, $2c$, and $2e$ and of the internal electrode layers $2b$, $2d$, and $2f$.

Furthermore, the dielectric layers $6a$ to $6g$ are formed from the dielectric ceramic described above.

In addition, while the internal electrode material constituting the internal electrode layers $2a$ to $2f$ is not to be considered particularly limited, a material is preferably used which contains an inexpensive and highly conductive Ni as its main constituent.

Thus, even in the case of the dielectric ceramic layer reduced in thickness to 1 μm or less and the number of stacked layers increased to 400 or more, the thermal shock resistance can be improved while ensuring the properties or characteristics such as dielectric properties, insulation properties, temperature characteristics, and characteristics in high temperature loading, and even when a rapid change in temperature is caused in the case of mounting, defects such as cracks which may be caused in the laminated ceramic capacitor can be avoided. This is believed to be because, as described above, the Al—Mg—Si oxide as crystalline oxide grains is present in contact with the conductive material in the internal electrodes $2a$ to $2h$, for example, Ni, and as a result, the resistance to the rapid change in temperature in the case of mounting is increased to improve the thermal shock resistance without damaging the properties or characteristics such as the dielectric properties.

Specifically, a high-performance and high-reliability laminated ceramic capacitor reduced in layer thickness and increased in the number of stacked layers can be achieved which has a high dielectric constant of 2500 or more, has a favorable insulation property with a CR product of 2150Ω·F or more, has temperature characteristics satisfying the X6S characteristics of EIA standards (rate of capacitance change in temperature within ±22% in the temperature range of −55° C. to +105° C.), and causes no failure even when an electric field of 10 kV/mm is applied at a high temperature of 105° C., or even when continuous driving is carried out for 500 hours or more.

In particular, when the main constituent contains therein the element M1, the rare earth element R, and the element M2 in the ranges described above, the properties or characteristics such as dielectric properties will not be decreased, and no failure will be caused even in the case of continuous driving for a long period of time of 2000 hours or more. Thus, a high-performance laminated ceramic capacitor with excellent reliability can be achieved.

Next, a method for producing the laminated ceramic capacitor described above will be briefly described.

First, as ceramic raw materials, a Ba compound and a Ti compound are prepared, and if necessary, a Ca compound, a Sr compound, a Zr compound, a Hf compound, etc. are prepared. Then, these ceramic raw materials are weighed in predetermined amounts, and the weighed materials are put along with a grinding medium such as PSZ (Partially Stabilized Zirconia) balls and pure water into a ball mill, subjected to sufficient mixing and grinding in a wet way, and to drying, and then subjected to a heat treatment at a temperature of 900° C. to 1200° C. for a predetermined period of time, thereby preparing a main constituent powder composed of a barium titanate based compound with an average grain size of 0.1 μm to 0.2 μm.

Then, an Al oxide, a Mg oxide, and a Si oxide are prepared, weighed in predetermined amounts, and then put along with a grinding medium into a ball mill for carrying out wet mixing. Then, this mixture is dried, and then subjected to a heat treatment at 900° C. to 1000° C. for a predetermined period of time to produce an Al—Mg—Si oxide.

Then, the main constituent powder, the Al—Mg—Si oxide, and further, if necessary, an M1 compound, an R compound, and an M2 compound as accessory constituent powders, are thereafter weighed so as to provide the main constituent powder (if necessary, including the accessory constituent powders):Al—Mg—Si oxide on the order of 99.2 to 99.6:0.4 to 0.8 in terms of ratio by weight, and mixed sufficiently to produce a ceramic raw material powder.

Then, this ceramic raw material powder is put along with an organic binder and an organic solvent, as well as a grinding medium, into a ball mill for carrying out wet mixing, thereby preparing a ceramic slurry, and the ceramic slurry is subjected to shape forming by a doctor blade method or the like to prepare ceramic green sheets so as to provide a thickness of 1 μm or less after firing.

A conductive material such as a Ni powder is mixed with an organic vehicle and an organic solvent, and kneaded in a three-roll mill, thereby preparing a conductive paste for internal electrodes.

Then, this conductive paste for internal electrodes is applied by screen printing onto the ceramic green sheets, thereby forming a conductive film in a predetermined pattern on the surfaces of the ceramic green sheets.

Then, the multiple ceramic green sheets with the conductive films formed thereon are stacked in a predetermined direction, sandwiched between ceramic green sheets on which no conductive films are formed, subjected to pressure bonding, and cut into a predetermined size to prepare a ceramic laminate. Then, the ceramic laminate is thereafter subjected to a treatment for the removal of the binder at a temperature of 300° C. to 500° C., and further subjected to a firing treatment at a temperature of 1100° C. to 1300° C. for about 2 hours in a reducing atmosphere composed of a $H_2$—$N_2$—$H_2O$ gas with an oxygen partial pressure controlled to $10^{-9}$ MPa to $10^{-12}$ MPa. The firing treatment provides co-sintered conductive films and ceramic green sheets, thereby resulting in the ceramic sintered body 1 with the dielectric layers 6a to 6s and internal electrodes 2a to 2f alternately stacked.

Next, a conductive paste for external electrodes is applied onto both end surfaces of the ceramic sintered body 1, and subjected to a firing treatment at a temperature of 600° C. to 800° C. to form the external electrodes 3a and 3b.

It is to be noted that while the conductive material contained in the conductive paste for external electrodes is also not to be considered particularly limited, it is preferable in terms of reduction in cost to use a material containing Ag or Cu, or an alloy thereof as its main constituent.

As a method for forming the external electrodes 3a and 3b, the conductive paste for external electrodes may be applied onto the both end surfaces of the ceramic laminate, and then subjected to a firing treatment at the same time as the ceramic laminate.

Then, finally, electrolytic plating is applied to form first plating films 4a and 4b composed of Ni, Cu, a Ni—Cu alloy, or the like on the surfaces of the external electrodes 3a and 3b, and further form second plating films 5a and 5b composed of solder, tin, or the like on the surfaces of the first plating films 4a and 4b, thus allowing for the production of a laminated ceramic capacitor.

It is to be noted that the present invention is not to be limited to the embodiment described above, and it comes near to stating the obvious that various changes can be made without departing from the spirit and scope of the present invention.

Next, examples of the present invention will be described specifically.

Example 1

Preparation of Samples

Sample Number 1

$BaCO_3$ and $TiO_2$ were weighed in predetermined amounts as ceramic raw materials, and these weighed materials were put along with PSZ balls and pure water into a ball mill, subjected to mixing and grinding in a wet way, and to drying, and then subjected to a heat treatment at a temperature of 1150° C. for about 2 hours, thereby preparing a main constituent powder composed of $Ba_{1.003}TiO_3$ with an average grain size of 0.15 μm.

Next, $Al_2O_3$, $MgCO_3$, and $SiO_2$ were prepared. These oxides were weighed so as to provide $Al_2O_3$:$MgCO_3$:$SiO_2$=1:2:2 in terms of molar ratio, and these weighed materials were put along with PSZ balls and pure water into a ball mill, subjected to mixing and grinding in a wet way, and then subjected to a heat treatment at 900° C. to prepare an Al—Mg—Si oxide. It is to be noted that this Al—Mg—Si oxide had an average grain size of 0.08 μm.

Then, the main constituent powder described above and the Al—Mg—Si oxide were weighed so as to provide 99.2:0.8 in terms of ratio by weight, then put along with PSZ balls and pure water into a ball mill and subjected to mixing in a wet way, and dried to obtain a ceramic raw material powder.

Next, the ceramic raw material powder was put along with ethanol and a polyvinyl butyral based binder, as well as PSZ balls, into a ball mill for carrying out wet mixing, thereby preparing a ceramic slurry, and the ceramic slurry was further subjected to shape forming by a doctor blade method, thereby preparing ceramic green sheets so as to provide a thickness of 0.8 μm after firing.

A conductive paste for internal electrodes was prepared containing a Ni powder, an organic vehicle, and an organic solvent.

Next, the conductive paste for internal electrodes was used to be applied by screen printing onto the ceramic green sheets, thereby forming a conductive film in a predetermined pattern on the surfaces of the ceramic green sheets.

Then, a predetermined number of ceramic green sheets with the conductive films formed thereon were stacked, sandwiched between ceramic green sheets with no conductive films formed, thereon subjected to pressure bonding, and cut into a predetermined size to prepare a ceramic laminate. Then, the ceramic laminate was thereafter subjected to a treatment for the removal of the binder at a temperature of 300° C. in a nitrogen atmosphere, and further subjected to a firing treatment at a temperature of 1120° C. for about 2 hours in a reducing atmosphere composed of a $H_2$—$N_2$—$H_2O$ gas with an oxygen partial pressure controlled to $10^{-10}$ MPa, thereby resulting in the co-sintered conductive films and ceramic green sheets, and thus preparing a ceramic sintered body with internal electrodes buried.

Next, a conductive paste for external electrodes was prepared containing a Cu powder and $B_2O_3$—$Li_2O$—$SiO_2$—BaO based glass frit. The conductive paste for external electrodes was applied onto both end surfaces of the ceramic sintered body, and subjected to a firing treatment at a temperature of 800° C. in a nitrogen atmosphere to form external electrodes, thereby preparing a sample of sample number 1.

The obtained sample had dielectric layers with a thickness of 0.8 μm each, and external dimensions of length: 1.6 mm, width: 0.8 mm, and thickness: 0.8 mm, the area of the electrode opposed per dielectric layer was 0.9 $mm^2$, and the effective number of dielectric ceramic layers was 400.

Next, a fracture surface of sample number 1 was subjected to polishing, observed under a FE-SEM, and subjected to a mapping analysis on composition in a WDX.

Figure 2:
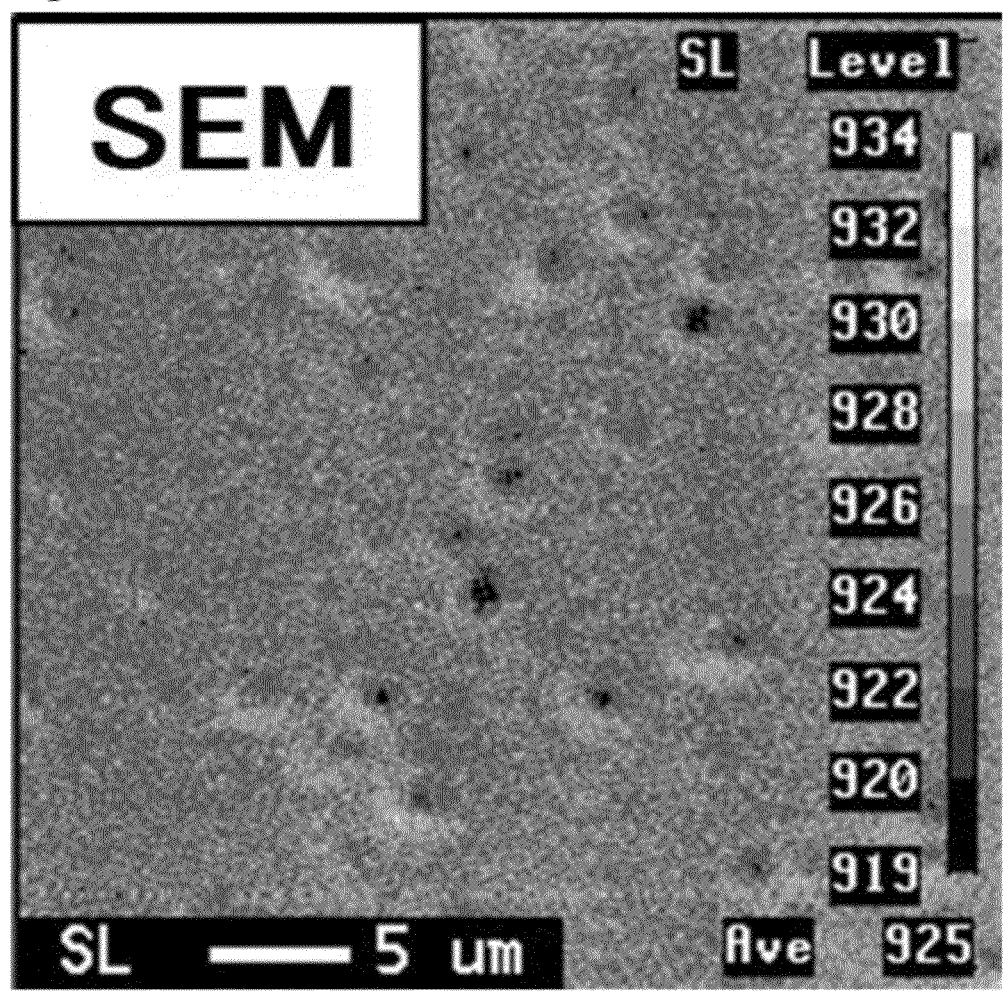
FIG. 2 is a SEM image for sample number 1 according to Example 1.
Figure 3:
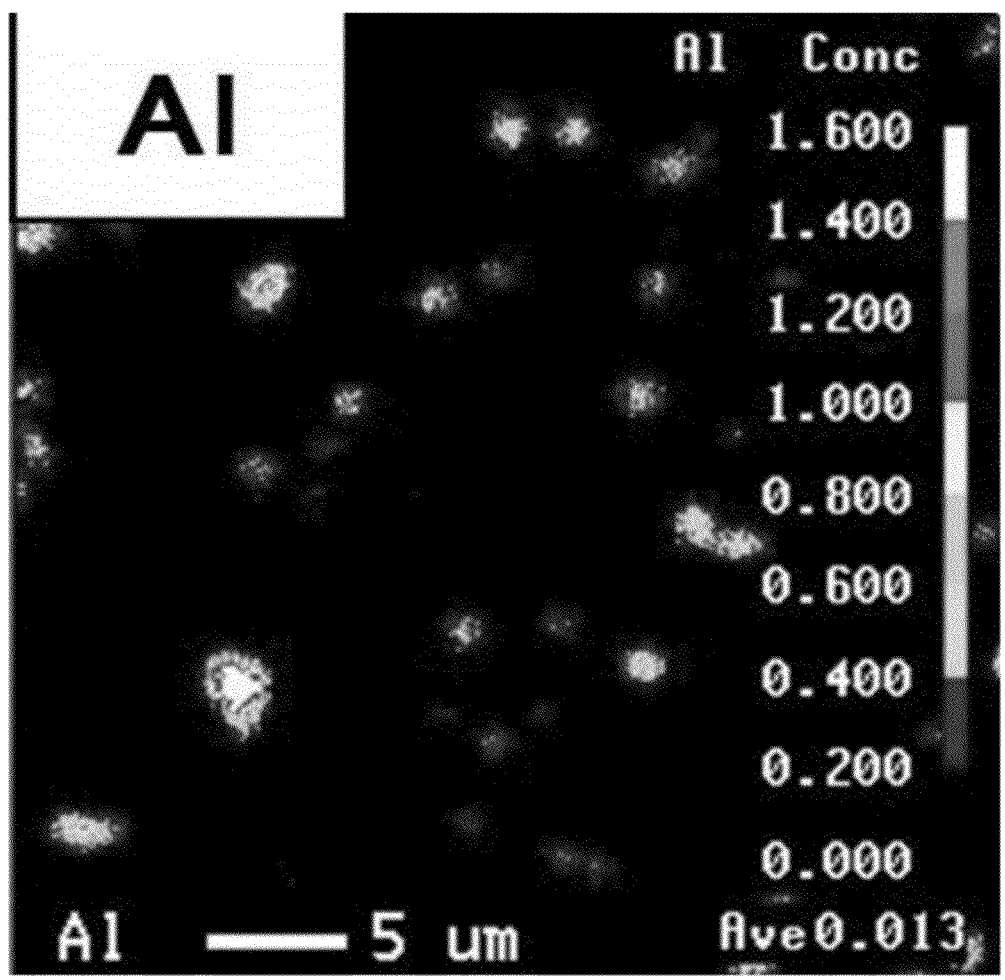
FIG. 3 is a mapping diagram illustrating Al segregation in sample number 1 mentioned above.
Figure 4:
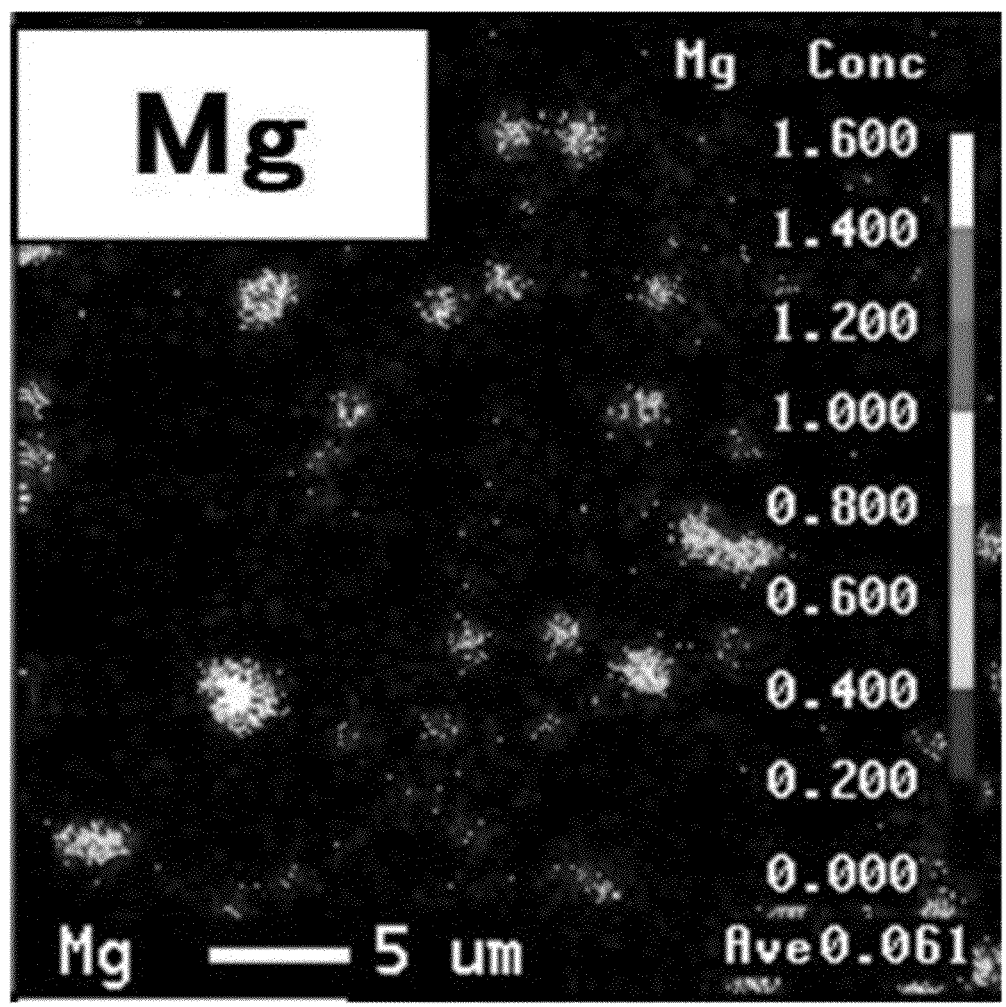
FIG. 4 is a mapping diagram illustrating Mg segregation in sample number 1 mentioned above.
Figure 5:
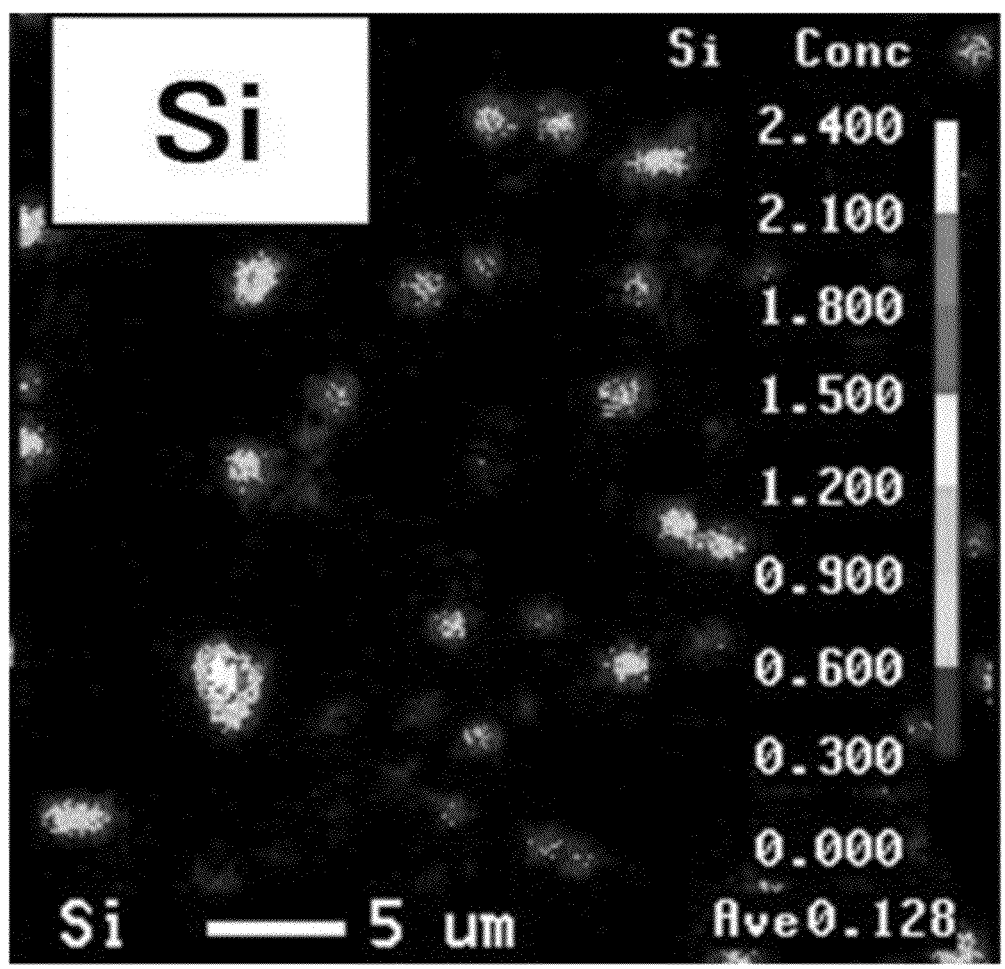
FIG. 5 is a mapping diagram illustrating Si segregation in sample number 1 mentioned above.

FIG. 2 is a SEM image in an arbitrary cross-section of sample number 1, and FIGS. 3 to 5 respectively show analysis results for Al, Mg, and Si.

As is clear from FIGS. 3 to 5, it has been confirmed that Al, Mg, and Si are present at substantially the same points. In addition, it has been confirmed that at each of these points, the content of the respective elements of Al, Mg, and Si is 50 mol % or more in total, and the respective elements of Al, Mg, and Si are each 5 mol % or more independently. Furthermore, it has been determined from these analysis results that the Al—Mg—Si oxide is present as secondary phase grains.

Further, slightly segregated Mg oxide and Si oxide were also confirmed in addition to the secondary phase grains, as is clear from FIGS. 4 and 5.

Sample Number 2

$Ba_{1.003}TiO_3$ was prepared in accordance with the same method and procedure as in the case of sample number 1.

$Al_2O_3$, $MgCO_3$, and $SiO_2$ were weighed so as to provide $Al_2O_3$:$MgCO_3$:$SiO_2$=1:2:2 in terms of molar ratio, thereby providing a mixture of $Al_2O_3$, $MgCO_3$, and $SiO_2$. Then, the $Ba_{1.003}TiO_3$ as the main constituent powder and the mixture described above were weighed so as to provide 99.2:0.8 in terms of ratio by weight, and these weighed materials were put along with PSZ balls and pure water into a ball mill, subjected to mixing and grinding in a wet way, and dried to obtain a ceramic raw material powder.

Then, a sample of sample number 2 was thereafter produced in accordance with the same method and procedure as in the case of sample number 1.

Furthermore, a sample number 2 fracture surface was subjected to polishing, observed under a FE-SEM, and subjected to a mapping analysis on composition in a WDX, and it has been confirmed that, unlike sample number 1, an Al oxide, a Mg oxide, and a Si oxide are each segregated independently as different phase grains without secondary phase grains of an Al—Mg—Si oxide present.

The evaluation was made for thermal shock resistance by carrying out a thermal shock resistance test on 50 samples for each sample number. More specifically, 50 samples for each sample number were each immersed for 3 minutes in a solder bath with its temperature set at 325° C., pulled out of the solder bath, encased in a resin, then subjected to polishing, and observed under a microscope, and the evaluations were made in such a way that a sample with an observable crack was determined to be defective.

The evaluation was made for characteristics in high temperature loading by carrying out a high temperature loading test on 100 samples for each sample number. More specifically, a voltage of 8 V was applied so as to provide an electric field strength of 10 kV/mm at a temperature of 105° C., the change in insulation resistance was measured with the passage of time, and the evaluations were made in such a way that a sample with a CR product of 50Ω·F or less after a lapse of 500 hours was determined to be a defective.

Table 1 shows the dielectric constant, the CR product, the temperature characteristics of capacitance, the thermal shock resistance, and the characteristics in high temperature loading for sample numbers 1 and 2.

TABLE 1

| Sample No. | Secondary Phase Grains | Different Phase Grains Other Than Seconday Phase Grains | Dielectric Constant (−) | CR Product (Ω · F.) | Temperature Characteristics of Capacitance | | | Thermal Shock Resistance | Characteristics in High Temperature Loading |
|---|---|---|---|---|---|---|---|---|---|
| | | | | | $\Delta C_{-55}/C_{25}$ | $\Delta C_{85}/C_{25}$ | $\Delta C_{105}/C_{25}$ | | |
| 1 | Yes | Mg Oxide, Si Oxide | 3650 | 2400 | −5.4 | −9.1 | −13.9 | 0/50 | 0/100 |
| 2* | No | Al Oxide, Mg Oxide, Si Oxide | 3750 | 2500 | −4.0 | −9.9 | −14.5 | 8/50 | 0/100 |

*outside the scope of the present invention

Evaluations of Samples

Sample numbers 1 and 2 were evaluated for dielectric constant, insulation resistance, temperature characteristics of capacitance, thermal shock resistance, and characteristics in high temperature loading in accordance with the following methods.

With the use of an automatic bridge measuring instrument, the capacitance C was measured under the conditions of frequency: 1 kHz, effective voltage: 0.5 Vrms, and temperature: 25° C., and the dielectric constant was calculated from these measurement values and the sample dimensions.

The evaluation for insulation resistance was made from the CR product, the product of capacitance C and insulation resistance R, obtained in such a way that a direct-current voltage of 4 V was applied at a temperature of 25° C. for 180 seconds to measure log IR.

The evaluation was made for temperature characteristics of capacitance in such a way that the rates of capacitance change in temperature $\Delta C_{-55}/C_{25}$, $\Delta C_{+85}/C_{25}$, and $\Delta C_{+105}/C_{25}$, at −55° C., +85° C., and +105° C. were measured with the use of the capacitance at +25° C. as a reference. It is to be noted that when the rate of capacitance change in temperature falls within ±22% in the temperature range of −55° C. to +105° C., the X6S characteristics of EIA standards will be satisfied.

Sample number 1 containing the Al—Mg—Si oxide as secondary phase grains thus achieved favorable results for all of dielectric constant, insulation resistance, temperature characteristics of capacitance, and characteristics in high temperature loading.

On the other hand, sample number 2 caused 8 defectives among the 50 samples in the thermal shock resistance test, thereby resulting in an increase in percent defectives, because of the Al—Mg—Si oxide segregated as respective independent oxides, rather than contained as secondary phase grains.

Example 2

$BaCO_3$, $CaCO_3$, $SrCO_3$, $TiO_2$, $ZrO_2$, and $HfO_2$ were prepared as ceramic raw materials. Then, these ceramic raw materials were weighed so as to provide the compositions of main constituents as shown in Table 2, put along with PSZ balls and pure water into a ball mill, subjected to mixing and grinding in a wet way, and to drying, and then subjected to a heat treatment at a temperature of 1100° C. to 1200° C. for about 2 hours, thereby preparing a main constituent powder with an average grain size of 0.11 μm to 0.17 μm.

Next, $Al_2O_3$, $MgCO_3$, and $SiO_2$ were prepared and these oxides were weighed so as to provide $Al_2O_3$:$MgCO_3$:$SiO_2$=1:

4:4 in terms of molar ratio. These weighed materials were put along with PSZ balls and pure water into a ball mill, subjected to mixing and grinding in a wet way, and then subjected to a heat treatment at 900° C. to provide an Al—Mg—Si oxide. It is to be noted that this Al—Mg—Si oxide had an average grain size of 0.06 μm.

Then, the main constituent powder described above and the Al—Mg—Si oxide were weighed so as to provide 99.5:0.5 in terms of ratio by weight, then put along with PSZ balls and pure water into a ball mill and subjected to mixing in a wet way, and dried to obtain a ceramic raw material powder.

Respective samples of sample numbers 11 to 16 were thereafter prepared in accordance with the same method and procedure as in the case of sample number 1.

For the respective samples of sample numbers 11 to 16, a fracture surface was subjected to polishing, observed under a FE-SEM, and subjected to a mapping analysis on composition in a WDX as in the case of Example 1, and it has been confirmed that the Al—Mg—Si oxide is present as secondary phase grains as in the case of sample number 1. In addition, in addition to the secondary phase grains, slightly segregated Mg oxide and Si oxide were also confirmed.

Next, the respective samples of sample numbers 11 to 16 were evaluated for dielectric constant, insulation resistance, temperature characteristics of capacitance, thermal shock resistance, and characteristics in high temperature loading in the same method and procedure as in the case of Example 1.

Table 2 shows the dielectric constant, the CR product, the temperature characteristics of capacitance, the thermal shock resistance, and the characteristics in high temperature loading for sample numbers 11 to 16.

Next, $Al_2O_3$, $MgCO_3$, and $SiO_2$ were prepared. The oxides were weighed so as to provide $Al_2O_3$:$MgCO_3$:$SiO_2$=1:2:4 in terms of molar ratio, and these weighed materials were put along with PSZ balls and pure water into a ball mill, subjected to mixing and grinding in a wet way, and then subjected to a heat treatment at 1000° C. to provide an Al—Mg—Si oxide. It is to be noted that this Al—Mg—Si oxide had an average grain size of 0.07 μm.

Next, $M1CO_3$ (M1 is Ba and Ca), $RO_{3/2}$ (R is La, Ce, Pr, Nd, Sm, Eu, Gd, Tb, Dy, Ho, Er, Tm, Yb, Lu, and Y), and $M2O_x$ (M2 is Mn, Ni, Co, Fe, Cr, Cu, Mg, Li, Al, Si, Mo, W, and V, and X is a positive number unambiguously determined by the valence of the element M2) were prepared as accessory constituents.

Then, the main constituent powder, $M1CO_3$, $RO_{3/2}$, and $M2O_x$ were weighed so as to provide 0 to 3.0 parts by mol of $M1CO_3$, 0 to 3.5 parts by mol of $RO_{3/2}$, and 0 to 6.2 parts by mol of $M2O_x$ with respect to 100 parts by mol of the main constituent, as shown in Table 3, and furthermore, the materials other than the Al—Mg—Si oxide (the main constituent powder, $M1CO_3$, $RO_{3/2}$, and $M2O_x$) as well as the Al—Mg—Si oxide were put along with PSZ balls and pure water into a ball mill so as to provide 99.6:0.4 in terms of ratio by weight, subjected to mixing and grinding in a wet way, and dried to obtain a ceramic raw material powder.

Respective samples of sample numbers 21 to 39 were thereafter prepared in accordance with the same method and procedure as in the case of sample number 1.

For the respective samples of sample numbers 21 to 39, a fracture surface was subjected to polishing, then observed under a FE-SEM, and subjected to a mapping analysis on composition in a WDX as in the case of Example 1, and it has

TABLE 2

| Sample No. | Composition of Main Constituent | Dielectric Constant (—) | CR Product (Ω · F.) | Temperature Characteristics of Capacitance | | | Thermal Shock Resistance | Characteristics in High Temperature Loading |
|---|---|---|---|---|---|---|---|---|
| | | | | $\Delta C_{-55}/C_{25}$ | $\Delta C_{85}/C_{25}$ | $\Delta C_{105}/C_{25}$ | | |
| 11 | $Ba_{1.005}TiO_3$ | 3850 | 2400 | −6.2 | −9.6 | −13.8 | 0/50 | 0/100 |
| 12 | $(Ba_{0.98}Sr_{0.02})_{1.005}(Ti_{0.995}Hf_{0.005})O_3$ | 3250 | 2400 | −6.4 | −11.3 | −15.3 | 0/50 | 0/100 |
| 13 | $(Ba_{0.98}Ca_{0.02})_{1.005}(Ti_{0.98}Hf_{0.02})O_3$ | 3650 | 2250 | −4.2 | −12.4 | −15.3 | 0/50 | 0/100 |
| 14 | $(Ba_{0.94}Ca_{0.06})_{1.005}(Ti_{0.98}Zr_{0.02})O_3$ | 3500 | 2150 | −4.7 | −11.1 | −14.2 | 0/50 | 0/100 |
| 15 | $(Ba_{0.8}Ca_{0.2})_{1.005}TiO_3$ | 3550 | 2150 | −5.5 | −11.5 | −15.5 | 0/50 | 0/100 |
| 16 | $(Ba_{0.97}Sr_{0.01}Ca_{0.02})_{1.005}(Ti_{0.99}Zr_{0.005}Hf_{0.005})O_3$ | 3800 | 2200 | −4.4 | −11.7 | −14.9 | 0/50 | 0/100 |

It has been confirmed that sample numbers 11 to 16, each containing the Al—Mg—Si oxide as secondary phase grains, achieved favorable results for all of the properties or characteristics of dielectric constant, insulation resistance, temperature characteristics of capacitance, thermal shock resistance, and characteristics in high temperature loading.

Example 3

$BaCO_3$, $CaCO_3$, $TiO_2$, and $ZrO_2$ were prepared as ceramic raw materials. These ceramic raw materials were weighed in predetermined amounts, put along with PSZ balls and pure water into a ball mill, subjected to mixing and grinding in a wet way, and to drying, and then subjected to a heat treatment at a temperature of 1150° C. for about 2 hours, thereby preparing a main constituent powder composed of $(Ba_{0.93}Ca_{0.07})_{0.998}(Ti_{0.996}Zr_{0.004})O_3$ with an average grain size of 0.17 μm.

been confirmed that the Al—Mg—Si oxide is present as secondary phase grains as in the case of sample number 1. In addition, in addition to the secondary phase grains, slightly segregated Mg oxide and Si oxide were also confirmed.

The respective samples of sample numbers 21 to 39 were evaluated for dielectric constant, insulation resistance, temperature characteristics of capacitance, thermal shock resistance, and characteristics in high temperature loading in the same method and procedure as in the case of Example 1. Further, a high temperature loading test was also carried out for 2000 hours in addition to 500 hours to make evaluations on characteristics in high temperature loading in Example 3.

Table 3 shows the compositions of the main constituents and accessory constituents (except the Al—Mg—Si oxide) for sample numbers 21 to 39, and Table 4 shows the dielectric constant, the CR product, the temperature characteristics of capacitance, the thermal shock resistance, and the characteristics in high temperature loading for sample numbers 21 to 39.

TABLE 3

$100 (Ba_{0.93}Ca_{0.07})_{0.998}(Ti_{0.996}Zr_{0.004})O_3 + aM1CO_3 + bRO_{3/2} + cM2O_x$

| Sample No. | M1 | a | R | b | M2 | c |
|---|---|---|---|---|---|---|
| 21** | Ba(0.4) | 0.4 | — | 0.0 | Mg/W(1.6/0.2) | 1.8 |
| 22 | Ba(0.3) | 0.3 | Dy(0.1) | 0.1 | V/Ni(0.3/1.8) | 2.1 |
| 23 | Ca(0.3) | 0.3 | Gd/Dy(0.6/0.6) | 1.2 | Ni/Mn/Cu(0.5/0.3/1) | 1.8 |
| 24 | Ba(0.3) | 0.3 | Nd/Ho(0.4/2.6) | 3.0 | V/Co/Li/Mo(0.3/0.5/0.8/0.2) | 1.8 |
| 25** | Ba(0.3) | 0.3 | Ho(3.5) | 3.5 | Mg/Cr/Cu(2/0.2/0.3) | 2.5 |
| 26** | Ba(0.3) | 0.3 | Er/Y(1/1) | 2.0 | — | 0.0 |
| 27 | Ba(0.3) | 0.3 | Dy/Yb(1.5/0.5) | 2.0 | Li/Mn(0.1/0.1) | 0.2 |
| 28 | Ba/Ca(0.2/0.2) | 0.4 | Ho(2.2) | 2.2 | Ni/Li/Si(0.5/0.5/0.25) | 1.25 |
| 29 | Ba/Ca(0.2/0.3) | 0.5 | Er/Y(0.8/1.2) | 2.0 | Fe/V/Al/Mg(0.1/0.1/0.5/1.5) | 2.2 |
| 30 | Ba/Ca(0.2/0.2) | 0.4 | Dy/Yb(0.6/0.6) | 1.2 | Mo/Ni(0.5/1) | 1.5 |
| 31 | Ba/Ca(0.2/0.2) | 0.4 | Lu/Ho/Ce(0.4/1/0.5) | 1.9 | Mg/Mn(4.8/0.2) | 5.0 |
| 32** | Ba(0.4) | 0.4 | Sm/Y(0.2/1) | 1.2 | V/Mo/Mg(0.1/0.1/6) | 6.2 |
| 33** | — | 0.0 | Eu/Dy(0.3/1.5) | 1.8 | Al/W(1.5/0.3) | 1.8 |
| 34 | Ba(0.2) | 0.2 | Y/Gd(1/1) | 2.0 | Al/Mn/Mg/Mo(1/0.3/1/0.1) | 2.4 |
| 35 | Ba(0.5) | 0.5 | Y(1.8) | 1.8 | V/Si/Mg(0.2/0.2/2) | 2.4 |
| 36 | Ba(2.0) | 2.0 | Pr/La/Ho(0.4/0.3/1.1) | 1.8 | Cu/Li(0.25/1) | 1.25 |
| 37 | Ba(3.0) | 3.0 | Dy/Tm(0.5/1.2) | 1.7 | Mg/Mn/W(2/0.3) | 2.3 |
| 38 | Ba(0.5) | 0.5 | Lu/Dy(1/1) | 2.0 | V/Co(0.3/1.8) | 2.1 |
| 39 | Ba(0.3) | 0.3 | Dy(1.9) | 1.9 | Li/Mn/Mg(1/0.1/1) | 2.1 |

**outside the scope of the present invention (claim 3)

TABLE 4

| Sample No. | Dielectric Constant (−) | CR Product (Ω·F.) | Temperature Characteristics of Capacitance | | | Thermal Shock Resistance | Characteristics in High Temperature Loading | |
|---|---|---|---|---|---|---|---|---|
| | | | $\Delta C_{-55}/C_{25}$ | $\Delta C_{85}/C_{25}$ | $\Delta C_{105}/C_{25}$ | | 500 hours | 2000 hours |
| 21** | 3900 | 2550 | −5.6 | −9.6 | −14.3 | 0/50 | 0/100 | 2/100 |
| 22 | 3550 | 2900 | −6.3 | −12.9 | −14.6 | 0/50 | 0/100 | 0/100 |
| 23 | 3350 | 2900 | −5.6 | −11.6 | −13.5 | 0/50 | 0/100 | 0/100 |
| 24 | 3150 | 2900 | −2.2 | −10.3 | −12.2 | 0/50 | 0/100 | 0/100 |
| 25** | 2250 | 2600 | −2.1 | −9.2 | −10.7 | 0/50 | 0/100 | 0/100 |
| 26** | 4050 | 2500 | −5.0 | −9.2 | −14.6 | 0/50 | 0/100 | 4/100 |
| 27 | 3500 | 3400 | −4.4 | −12.1 | −13.1 | 0/50 | 0/100 | 0/100 |
| 28 | 3450 | 3100 | −3.9 | −11.9 | −13.2 | 0/50 | 0/100 | 0/100 |
| 29 | 3250 | 2900 | −3.7 | −11.3 | −12.2 | 0/50 | 0/100 | 0/100 |
| 30 | 3200 | 2750 | −1.4 | −9.9 | −11.5 | 0/50 | 0/100 | 0/100 |
| 31 | 3050 | 2600 | −1.5 | −9.9 | −12.0 | 0/50 | 0/100 | 0/100 |
| 32** | 2300 | 2450 | −1.7 | −8.5 | −10.9 | 0/50 | 0/100 | 0/100 |
| 33** | 3850 | 2900 | −4.2 | −11.7 | −12.2 | 0/50 | 0/100 | 1/100 |
| 34 | 3450 | 2900 | −3.6 | −10.7 | −12.0 | 0/50 | 0/100 | 0/100 |
| 35 | 3400 | 2900 | −3.5 | −11.5 | −12.7 | 0/50 | 0/100 | 0/100 |
| 36 | 3100 | 2950 | −2.7 | −12.2 | −12.9 | 0/50 | 0/100 | 0/100 |
| 37 | 2500 | 2300 | −2.2 | −12.3 | −13.9 | 0/50 | 0/100 | 0/100 |
| 38 | 3300 | 2900 | −3.7 | −11.4 | −12.3 | 0/50 | 0/100 | 0/100 |
| 39 | 3400 | 2850 | −3.7 | −11.5 | −11.6 | 0/50 | 0/100 | 0/100 |

**outside the scope of the present invention (claim 3)

Sample numbers 21 to 39 each containing the Al—Mg—Si oxide present as secondary phase grains thus achieved favorable results for the insulation resistance, the temperature characteristics of capacitance, and the characteristics in high temperature loading for 500 hours.

However, sample number 21, having no addition of the element R, had two defectives among the 100 samples after a lapse of 2000 hours in the characteristics in high temperature loading, while no defective was present after a lapse of 500 hours.

In addition, sample number 26, where there was no addition of the element M2, had four defectives among the 100 samples after a lapse of 2000 hours in the characteristics in high temperature loading, while no defective was present after a lapse of 500 hours.

Sample number 33, having no addition of the element M1, had one defective among the 100 samples after a lapse of 2000 hours in the characteristics in high temperature loading, while no defective was present after a lapse of 500 hours.

On the other hand, the dielectric constant of sample number 25 was decreased to 2250, because the element R in sample number 25 was excessively 3.5 parts by mol with respect to 100 parts by mol of the main constituent.

The dielectric constant of sample number 32 was decreased to 2300, because the element M2 in sample number 32 was excessively 6.2 parts by mol with respect to 100 parts by mol of the main constituent.

On the other hand, sample numbers 22 to 24, 27 to 31, and 34 to 39 containing 0.2 to 3.0 parts by mol of the element M1 with respect to 100 parts by mol of the main constituent, 0.1 to 3.0 parts by mol of the element R with respect to 100 parts by mol of the main constituent, and 0.2 to 5.0 parts by mol of the element M2 with respect to 100 parts by mol of the main constituent, thus provided favorable dielectric constants, and also caused no defectives even after a lapse of 2000 hours in the high temperature loading test, thereby allowing for the achievement of favorable characteristics in high temperature loading.

Thus, it has been determined that the samples containing 0.2 to 3.0 parts by mol of the element M1 with respect to 100 parts by mol of the main constituent, 0.1 to 3.0 parts by mol of the element R with respect to 100 parts by mol of the main constituent, and 0.2 to 5.0 parts by mol of the element M2 with respect to 100 parts by mol of the main constituent, allow the characteristics in high temperature loading to be improved without damaging the properties or characteristics such as dielectric properties and thermal shock resistance, thereby allowing for a further improvement in reliability.

INDUSTRIAL APPLICABILITY

Even in the case of the dielectric layer reduced in thickness to 1 μm or less and the number of stacked layers increased to 400 or more, the thermal shock resistance is improved while ensuring the properties or characteristics such as dielectric properties, insulation properties, temperature characteristics, and characteristics in high temperature loading.

What is claimed is:

1. A dielectric ceramic containing, as its main constituent, a barium titanate compound represented by the general formula $ABO_3$ in which A comprises Ba and B comprises Ti, and a crystalline oxide containing Al, Mg, and Si is present as secondary phase grains.

2. The dielectric ceramic according to claim 1, having secondary phase grains which contain at least 5 mol % of each of Al, Mg, and Si, and have a total content of Al, Mg, and Si of at least 50 mol %.

3. The dielectric ceramic according to claim 2, wherein the A contains Ba in the range of 78 to 100 mol %, Sr in the range of 0 to 2 mol %, and Ca in the range of 0 to 20 mol %, and the B contains Ti in the range of 96 to 100 mol %, Zr in the range of 0 to 2 mol %, and Hf in the range of 0 to 2 mol %.

4. The dielectric ceramic according to claim 2, containing at least one of M1, R and M2, in which M1 is Ba and Ca or both, R is at least one element selected from the group consisting of La, Ce, Pr, Nd, Sm, Eu, Gd, Tb, Dy, Ho, Er, Tm, Yb, Lu, and Y, and M2 is at least one element selected from the group consisting of Mn, Ni, Co, Fe, Cr, Cu, Mg, Li, Al, Si, Mo, W, and V, wherein the content of M1 is 0.2 to 3 parts by mol with respect to 100 parts by mol of the main constituent, the content of R is 0.1 to 3 parts by mol with respect to 100 parts by mol of the main constituent, and the content of M2 is 0.2 to 5 parts by mol with respect to 100 parts by mol of the main constituent.

5. A laminated ceramic capacitor comprising alternately stacked dielectric layers and internal electrodes, wherein the dielectric layers comprise a dielectric ceramic according to claim 4.

6. The laminated ceramic capacitor according to claim 5, wherein the internal electrodes contain Ni as their main constituent.

7. A laminated ceramic capacitor comprising alternately stacked dielectric layers and internal electrodes, wherein the dielectric layers comprise a dielectric ceramic according to claim 3.

8. The laminated ceramic capacitor according to claim 7, wherein the internal electrodes contain Ni as their main constituent.

9. A laminated ceramic capacitor comprising alternately stacked dielectric layers and internal electrodes, wherein the dielectric layers comprise a dielectric ceramic according to claim 3.

10. The laminated ceramic capacitor according to claim 9, wherein the internal electrodes contain Ni as their main constituent.

11. A laminated ceramic capacitor comprising alternately stacked dielectric layers and internal electrodes, wherein the dielectric layers comprise a dielectric ceramic according to claim 2.

12. The laminated ceramic capacitor according to claim 11, wherein the internal electrodes contain Ni as their main constituent.

13. A laminated ceramic capacitor comprising alternately stacked dielectric layers and internal electrodes, wherein the dielectric layers comprise a dielectric ceramic according to claim 1.

14. The laminated ceramic capacitor according to claim 13, wherein the internal electrodes contain Ni as their main constituent.

* * * * *